United States Patent
Johnson (10) Patent No.: US 9,708,978 B2
(45) Date of Patent: Jul. 18, 2017

(54) HEAT ENGINE

(76) Inventor: Murray R. K. Johnson, Kew (GB)

(*) Notice: Subject to any disclaimer, the term of this patent is extended or adjusted under 35 U.S.C. 154(b) by 1484 days.

(21) Appl. No.: 13/417,865

(22) Filed: Mar. 12, 2012

(65) Prior Publication Data

US 2012/0240551 A1  Sep. 27, 2012

Related U.S. Application Data (60) Provisional application No. 61/465,806, filed on Mar. 24, 2011.

(51) Int. Cl.
| | |
|---|---|
| F02C 6/18 | (2006.01) |
| F01K 9/02 | (2006.01) |
| F03G 6/02 | (2006.01) |
| F03D 9/00 | (2016.01) |

(52) U.S. Cl.
CPC ............ *F02C 6/18* (2013.01); *F01K 9/02* (2013.01); *F03D 9/007* (2013.01); *F03G 6/02* (2013.01); *F05B 2240/131* (2013.01); *F05B 2260/24* (2013.01); *Y02E 10/465* (2013.01);
(Continued)

(58) Field of Classification Search
CPC ....... Y02E 20/14; Y02E 20/16; Y02E 10/465; F01K 9/02; F01K 23/20; F01K 23/101; F01K 23/106; F22B 1/1815; F28B 1/00; F28B 1/06; F02C 6/00; F02C 6/18; F02C 1/007; Y10S 261/87; Y10S 415/909;
(Continued)

(56) References Cited

U.S. PATENT DOCUMENTS

| | | | | |
|---|---|---|---|---|
| 3,047,479 A | * | 7/1962 | Young | .............. G21D 5/08 122/31.1 |
| 3,936,652 A | * | 2/1976 | Levine | .............. F03D 9/00 261/DIG. 11 |
| 4,016,725 A | | 4/1977 | Fiss | |

(Continued)

FOREIGN PATENT DOCUMENTS

| | | |
|---|---|---|
| CA | 1081479 | 7/1980 |
| GB | 1 027 301 | 4/1966 |

(Continued)

OTHER PUBLICATIONS

Search Report of the Great Britain Patent Office issued in Great Britain Application No. 0822224.2 dated Mar. 25, 2009 (1 page).
(Continued)

*Primary Examiner* — Gerald L Sung
*Assistant Examiner* — William Breazeal
(74) *Attorney, Agent, or Firm* — Flynn, Thiel, Boutell & Tanis, P.C.

(57) ABSTRACT

A heat engine for use in conjunction with a power generating plant, including a turbine section having a number of turbines, a heat exchanger section having a number of modules through which the expanded working fluid of the power generating plant and other sources of heat are circulated, a laminar flow inducing section, and a tower section for providing a pressure differential across the turbines of the turbine section. In use, the heat engine provides the dual function of: heating air to generate an updraft such that air forces its way into the turbine sections to drive the turbines and generate additional electricity; and using incoming colder air to condense the expanded working fluid and cool other sources of heat.

35 Claims, 7 Drawing Sheets

(52) U.S. Cl.
CPC .............. *Y02E 20/14* (2013.01); *Y10S 261/87* (2013.01); *Y10S 415/909* (2013.01)

(58) Field of Classification Search
CPC .. F05B 2240/131; F05B 2260/24; F03G 6/02; F03D 9/007
USPC ................................ 60/650, 682; 290/44, 55
See application file for complete search history.

(56) References Cited

U.S. PATENT DOCUMENTS

| | | | |
|---|---|---|---|
| 4,036,916 A | 7/1977 | Agsten | |
| 4,499,034 A | 2/1985 | McAllister, Jr. | |
| 4,677,307 A * | 6/1987 | Vadas | F01K 9/003 290/2 |
| 7,086,823 B2 * | 8/2006 | Michaud | F03D 1/04 415/4.2 |
| 7,112,893 B1 | 9/2006 | Villanueva | |
| 2003/0168864 A1 * | 9/2003 | Heronemus | F03D 13/20 290/55 |
| 2004/0253093 A1 * | 12/2004 | Shibata | F03D 1/025 415/4.1 |
| 2011/0173980 A1 * | 7/2011 | Yangpichit | F03G 6/04 60/641.12 |
| 2012/0204565 A1 * | 8/2012 | Brooks | F03G 6/06 60/641.15 |

FOREIGN PATENT DOCUMENTS

| | | |
|---|---|---|
| GB | 1 096 539 | 12/1967 |
| GB | 0822224.2 | 3/2009 |
| WO | WO 2005/008065 | 1/2005 |

OTHER PUBLICATIONS

Joerg Schlaich, Rudolf Bergermann, Wolfgang Schiel, Gerhard Weinrebe, "Design of Commercial Solar Updraft Tower Systems—Utilization of Solar Induced Convective Flows for Power Generation", Mar. 2003, pp. 1-9, Am. Soc. of Mech. Eng.

* cited by examiner

SECTION THROUGH A-A

FIG. 4

SECTION THROUGH B-B

FIG. 5

SECTION THROUGH C$_1$-C$_1$

FIG. 6a

SECTION THROUGH C$_2$-C$_2$

HEAT ENGINE

CROSS REFERENCE TO RELATED APPLICATION

This claims the benefit of U.S. Provisional Application No. 61/465,806, filed Mar. 24, 2011, the disclosure of which is hereby incorporated by reference in its entirety.

FIELD OF THE INVENTION

This invention relates to a heat engine and to a method of operating a heat engine.

More particularly, the invention relates to a heat engine and associated operating method for generating additional power from sources of heat produced by a thermal power plant, chemical plant, or an other industrial process which generates heat.

BACKGROUND TO THE INVENTION

While the invention is by no means limited to being used in conjunction with a conventional thermal power plant, for simplicity, in the following description the invention will be described in conjunction with an otherwise conventional thermal power plant using water as the working fluid and operating a steam cycle.

A conventional thermal power plant is operated using demineralised water as the working fluid that is heated to a vapour in a boiler and expanded through a number of turbines in series, or in parallel, or in a combination of series and parallel, to drive generators to generate electricity. The expanded vapour is then condensed in a cooling system to a liquid and returned to the boiler where the water is reheated to steam to repeat the power generation cycle.

The cooling system is typically a wet system and includes a condenser, one or more cooling towers and a recirculation pump.

In a wet cooling system, the expanded steam is condensed in the condenser by heat exchange with cooling feed water typically extracted from a naturally occurring body of water such as the sea, a river, a lake or a reservoir. The feed water is typically circulated through pipes in the condenser around which the expanded steam flows and condenses on the cold surface of the pipes. However, in an alternative arrangement, the cold feed water is sprayed onto pipes through which the expanded steam is circulated, thereby condensing the steam.

The feed water heated up in the condenser by the expanded steam is pumped to the cooling towers and sprayed onto rocks inside the towers. The feed water is cooled by heat exchange with colder, outside, air that enters at the base of the cooling tower and rises up the cooling tower as it is heated by the hotter feed water. This creates a natural updraft of air inside the cooling tower which is assisted by any prevailing wind passing over the top of the cooling tower, creating a draw. The feed water is collected in a reservoir at the base of the cooling tower and is recirculated by the pump through the condenser, or released to the naturally occurring body of water and replaced by a fresh supply of cooling feed water.

Problems with wet cooling include the requirement for a ready source of cooling feed water, the large expanse of land required to accommodate the several large cooling towers that are often required for a single power plant, and the need to comply with legislation that typically stipulates that the waste feed water must be cooled to a certain temperature before being returned to the source in order to prevent a rise in the temperature of the source affecting local eco-systems. These problems mean that it is more difficult to locate power plants and their associated cooling towers in built-up areas. The operation of cooling the feed water also uses energy from the power plant leading to a reduction in net useable energy from the power station and an associated reduction in system efficiency.

An alternative thermal power plant, such as the Matimba Power Plant in Ellisras, South Africa, employs an air-cooled condenser in which ambient air is used to cool steam expanded in a steam turbine. The expanded steam is circulated through pipes in the condenser around which cold air flows to cool and condense the steam before it is returned to the boiler. Sometimes, for example at Scottish Power's Rye House power station, large electric fans (blade diameters typically of the order of 6 meters) blow air over the cooling pipes to enhance cooling.

A problem of air cooled condensers is that they are typically larger and more expensive to build and operate, and are less efficient at condensing an expanded vapour, than conventional water-cooled condensers such as that described above.

DESCRIPTION OF THE PRIOR ART

Improvements in the efficiency of the traditional power plant cooling system described above have developed along two distinct and identifiable strains.

The first strain, examples of which shall now be provided, has been concerned with capturing energy that otherwise would go to waste by harnessing the "chimney effect" of the cooling tower. Air flowing across the top of the tower creates a draw on air inside the cooling tower causing air warmed in the cooling tower to rise and, in doing so, to drive one or more turbines positioned within, or above, the cooling tower to generate additional electricity.

U.S. Pat. No. 4,016,725 discloses an energy recapture device consisting of a rotor positioned inside a cooling tower of a thermoelectric plant. The rotor is rotated by the natural thermal updraft in the cooling tower to drive a generator to produce additional electricity.

U.S. Pat. No. 4,016,725 and U.S. Pat. No. 4,036,916 teach that the rotor of the energy recapture device is preferably positioned inside a hyperbolic cooling tower at the throat of the veil where the rising air is moving at its highest velocity to improve the power generation.

U.S. Pat. No. 7,112,893 describes a modified energy recapture device consisting of a rigid frame for positioning over the top of a power plant cooling tower, the frame supporting a generator fan. The updraft of air in the cooling tower is used to drive the fan which is coupled to electrical generators attached to the frame in order to generate additional electricity.

U.S. Pat. No. 3,936,652 describes that a number of generators may be positioned in ducts Circumferentially around the base of a cooling tower. The natural thermal updraft in the cooling tower draws colder outside air through the ducts into the cooling tower which is used to generate additional power. Waste heat from the power plant is circulated through coiled pipes attached to the insulation on the inside face of the cooling tower veil to increase the flow rate of the thermal updraft through the cooling tower.

The second prior art strain, examples of which shall now be provided, has been concerned with positioning all, or part, of a power plant cooling system inside a conventional cooling tower so that the chimney effect can be used to draw cooler outside air in at the base of the cooling tower and around the components of the cooling system to increase the efficiency with which sources of heat from the power plant flowing through the cooling system can be air-cooled.

United Kingdom Patent No. GB1096539 discloses a modified power generating system in which the expander, cooling system components and flue gas stack are located inside a conventional cooling tower. Radiators are positioned around the periphery of the base of the cooling tower so that cooler outside air drawn into the cooling tower passes between radiator cooling fins to cool the working fluid pumped through the radiators.

United Kingdom Patent No. GB1027301 also discloses a modified power plant in which the expander, cooling system components and flue gas stack are located within a cooling tower and cold outside air is drawn into the base of the cooling tower and over the surface of radiators positioned around the periphery of the base to cool the working fluid pumped through the radiators.

Canadian Patent Publication No. CA1081479 discloses a dry cooling power plant system in which an elastic fluid expanded in a turbine is released from outlet ports into high and low pressure condensing sections. A fluid coolant for condensing the expanded fluid is circulated through cooling circuits having heat absorption portions located in the condensing sections and heat rejection portions located in a cooling tower.

Another type of power generation apparatus is disclosed in PCT Publication Number WO2005/008065. This application discloses the use of a tall tower or 'heat chimney' into which heat from one of a number of possible sources is fed to heat air and cause the air to rise inside the tower and drive a number of turbines.

SUMMARY OF THE INVENTION

The inventor of the present invention is the first to appreciate that heat energy which is typically lost, or deliberately dissipated, from power plant cooling towers can be used to provide additional power for a given quantity of fuel used to run the power station. The inventor has appreciated that it is possible to overcome drawbacks of known cooling systems by using this waste heat to provide a 'hot tower' working in conjunction with a power plant in a hybrid arrangement as opposed to simply dissipating the waste heat in one or more traditional cooling towers. Furthermore, by effectively managing the flow rate of air rising up through the heat engine, the power generating capability of the heat engine working in combination with the power plant can be optimised.

An object of the present invention is to provide a heat engine working in a hybrid arrangement with a thermal power plant, or other industrial processes that produce one or more sources of waste heat.

A further object of the invention is to collect sources of waste heat from various points around a thermal power plant, the heat from which is presently dissipated to the atmosphere by the cooling towers and use this heat to provide additional electrical power, thereby raising the overall efficiency of the power plant.

A further object of the invention is to use the heat engine to generate additional electrical power from a power plant whilst operating the power plant with efficiency comparable to that of the power plant alone, without the heat engine.

A further object of the invention is to reduce or eliminate consumption of cooling feed water and reduce the amount of carbon dioxide per unit of electricity generated in a traditional thermal power plant operating without the heat engine of the invention.

A further object of the invention is to enable a power plant to more easily and effectively be installed and operated in a built-up area.

A preferred embodiment of the present invention provides a heat engine for generating power from heat sources, said heat engine comprising:

a turbine section, said turbine section having at least one air inlet and at least one rotor, said rotor being positioned to be rotated by air flowing through said air inlet;

a generator coupled to said rotor for generating power as the rotor is rotated;

a tower section, said tower section having an air outlet, said tower section being positioned above the turbine section and arranged to receive air flowing from said turbine section and deliver it to said air outlet;

a heat exchanger section positioned between said turbine section and said tower section and comprising a heat exchanger, said heat exchanger being adapted to be connected to the heat sources and configured to transfer heat from the heat sources to air flowing from said turbine section into said tower section;

said heat exchanger including a plurality of modules including at least one upper module, and at least one lower module positioned below the upper module, said modules being arranged to receive sources of heat at different temperatures, said upper module being adapted to receive from a heat source at a higher temperature than the lower module;

said modules being positioned substantially across the entire transverse cross sectional area of said heat exchanger section.

Preferably, the heat sources for the heat engine are sources of heat generated by a power plant.

Preferably the heat exchanger section also acts as a condenser for condensing a working fluid expanded through an expander of a power plant. In the case of a thermal power plant operating a steam cycle, the expanded working fluid is expanded steam.

A preferred embodiment of the heat engine of the invention operates by collecting fluid sources of waste heat from a power plant. These sources include the expanded steam and possibly also bearing coolants. The fluids are then circulated through the plurality of modules in the heat exchanger to provide a large radiator for heating up air inside the heat engine. This maintains a warm, light, column of air that is less dense than ambient air surrounding the heat engine which creates a pressure differential between the outlet and inlet of the heat engine. The warmer, lower density air rises up through the heat exchanger and tower sections and the pressure differential causes outside air to force its way into the heat engine at the turbine section to replace the rising warmer air and, in doing so, drives one or more rotors, preferably turbines, and associated generators to generate additional electrical power. The increased volume flow rate of air passing through the heat engine also acts to condense the expanded working fluid and cool other sources of waste heat from a power plant that are circulated through the heat exchanger section.

Additional turbines and associated generators can be brought into operation by a control system. This has the advantage of generating additional electrical power but offers greater resistance to the flow rate of air into the heat exchanger section which reduces the efficiency with which the ambient air can be used to condense the expanded steam and cool the sources of waste heat in the heat exchanger section.

Operating the heat engine effectively in response to changing ambient temperatures and prevailing weather conditions therefore requires the control system to manage the flow rate of ambient air through the heat engine and achieve an optimal balance between the electricity generation and power plant condenser cooling functions of the heat engine. In order to keep the power plant running efficiently, it is important that the expanded steam is condensed in the heat exchanger section and returned to the boiler at the correct temperature. This minimises the energy and fuel required to reheat the expanded steam in the boiler.

On a cold day, when the ambient air more easily condenses the expanded steam and cools other waste heat sources from the power plant, a greater number of turbines may be brought into operation by the control system to generate additional electricity.

On a warmer day, when the ambient air is less efficient at condensing the expanded steam and cooling other waste heat sources from the power plant, fewer turbines will be operated by the control system in order to minimise the resistance to the flow or ambient air into the heat engine at the turbine section. This represents a shift in focus from the power generation function to the condenser cooling function of the heat engine.

The control system can also be used to control the temperature of the heat sources delivered to, and circulated through, the various modules. When conditions permit, additional waste heat sources, such as bearing coolants from other sites around the power plant, can be circulated through modules in order to transfer more heat to the air in the heat exchanger section and cause a greater pressure differential across the turbines. This creates an increase in flow rate of air through the heat engine enabling the turbines and generators to generate additional electrical power at a faster rate. Alternatively, waste heat sources can be diverted away from the heat exchanger section to reduce the pressure differential across the turbines and the associated flow rate of incoming ambient air to reduce the rate of generation of additional power and reduce the resistance to the flow of cooling air forcing its way into the turbine and heat exchanger sections to cool the condenser.

Embodiments of the invention enable some or all of the following advantages to be achieved:

i. the overall efficiency of the power plant is increased by the heat engine generating more electricity per unit of burnt fuel;

ii. the system requires less fuel per unit of electricity generated than existing power plant alone representing a significant reduction in power generation costs;

iii. the system generates additional electricity from waste heat which is currently vented to the atmosphere by power plant cooling towers offering significant reduction in carbon dioxide generation;

iv. by completely air-cooling, or predominantly air-cooling, the condenser, the supply of feed water is not necessary or is significantly reduced, making the heat engine more suitable for use in built up areas;

v. the land area required for the power plant cooling system is reduced compared to that required by conventional cooling towers, making the heat engine more suitable for use in areas of limited land availability;

vi. the need to cool waste feed water before returning it to the source is eliminated or reduced, resulting in increased net energy output compared to conventional cooling systems;

vii. the system eliminates or reduces vapour plume compared to that produced by conventional cooling towers thereby reducing the effects on the surrounding climate;

viii. by circulating the sources of waste heat through the heat exchanger section such that the hottest sources are directed to the uppermost module or modules and the coolest sources are directed to the lowermost module or modules, the most effective heating of air in the heat engine and therefore optimum cooling of the modules and electricity generation by the rotors is provided;

ix. the provision of a tall tower section provides sufficient pressure differential across the heat engine for colder outside air to force its way into the turbine section to provide optimum cooling and electric power generation at the turbines;

x. the reduction in land area required compared to conventional cooling towers provides a more compact design which means that the heat engine can be positioned closer to the thermal plant to simplify and improve flow of energy through system;

xi. poisonous waste discharge is eliminated;

xii. once installed, the system is low maintenance, meaning that running costs are low;

xiii. a proportion of additional electricity generated can be used for power plant environmental impact minimisation;

xiv. the heat engine may be part of a combined heat and power unit so it can be used to provide electrical power and/or heat to surrounding buildings and homes in the proportions required by the consumption demands.

It is envisaged that the heat engine will operate most effectively in cooler climates where the greater differential between the temperature of the waste heat sources and the outside air temperature results in a greater pressure differential across the turbines and a subsequent increase in condenser cooling and power generation capabilities.

Unlike known power generation or energy recapture systems, the heat engine of the invention can operate using only sources of waste heat from a power plant; no additional heat from geothermal, solar energy sources, or the like, is required. Instead, the heat engine of the present invention can be operated effectively at all times of day and does not need to be positioned, for example, in a desert or other location enabling the use of geothermal heat or where a source of cooling water is available.

Preferably the transverse cross-sectional area of the heat exchanger section is substantially greater than the transverse cross-sectional area of the tower section so as to accommodate the modules and provide sufficient throughflow area for air.

Preferably the transverse through-flow area of the heat exchanger section is substantially the same as the transverse through-flow area of the tower and wherein the heat exchanger and tower sections have substantially uniform throughflow transverse cross-sectional area for air. This prevents throttling down as the air rises from the heat exchanger into the tower section.

Preferably an adjustment system is provided for adjusting the impedance of the turbine section to air entering through the air turbine section and flowing up through the heat exchanger section and into the tower section so as to enhance control over the flow rate of air entering the heat engine and the rate of additional electrical energy generation. Preferably the rotor of at least one of the turbines includes variable pitch blades and the adjustment system includes a blade pitch adjustment system for adjusting the pitch of the blades.

Preferably the adjustment system includes at least one selectively openable aperture through which air can enter the turbine section without passing at least one rotor so that the airflow may bypass the respective rotor.

Preferably the adjustment system includes a coupling system for selectively coupling the rotor to the generator so as to permit selective coupling and decoupling of the generator.

Preferably the turbine section includes a plurality of rotors, coupled to a respective plurality of generators and the adjustment system comprises a coupling system for selectively coupling each of the rotors to its respective generator.

Preferably a control system is provided which includes sensors for detecting the temperature of the heat sources and for altering the adjustment system according to the temperatures of the heat sources so as to control the flow rate of air flowable through the air inlet to the air outlet.

Preferably the tower section is of a height sufficient to produce a pressure differential which draws air into the at least one air inlet of the turbine section. The tower is preferably between 300 and 500 meters tall but may equally be shorter or taller to meet the desired operating characteristics.

Preferably one of the heat sources supplied to the heat engine is the working fluid of a power generation plant which has been expanded through an expander of a power generation plant.

Preferably at least one of the modules comprises a part of, or the entirety of, a condenser of a cooling system of a power generation plant so that the at least one module acts as a combined condenser for the power plant and a radiator for heating air inside the heat engine. Preferably the modules are formed from straight pipe sections joined with bend sections to form flow paths for sources of heat. Alternatively, the modules may be formed from coiled pipes to form flow paths for sources of heat. Preferably the modules are isolated from one another to segregate respective heat sources.

Preferably the at least one rotor comprises at least one turbine. Preferably the rotors are ultra low pressure turbines. This advantageously ensures that they will still operate when the pressure differential between the inlet and outlet of the heat engine is low.

Preferably a plurality of turbines is provided and at least one of the turbines has adjustable blades so as to adjust the impedance to the flow of air past the turbine. Preferably each turbine is positioned within a respective duct, the ducts being spaced circumferentially around the turbine section and each having a respective inlet for air. Preferably an air duct closing system is provided for selectively closing one or more of said air inlets of said ducts. The turbine ducts enables the turbines to be more effectively rotated by ambient air forcing its way into the turbine section. This ensures optimum efficiency of electricity generation by the turbine and generator and means that an individual turbine can be isolated or removed for maintenance or replaced while the others remain in operation.

Preferably a tapering funnel section is provided between the heat exchanger section and the tower section for funnelling air from the heat exchanger section into tower section and minimising resistance to the flow of air into the tower section.

Preferably a laminar flow inducing section is provided between the heat exchanger section and the tower section which includes means for inducing laminar flow of air flowing from the heat exchanger section into the tower section preferably the laminar flow inducing means comprises one or more pipe arrays, each array formed as a plurality of parallel straight pipe sections. Inducing laminar flow to enhance the operation of the heat engine by: insulating the body of air flowing up the tower; minimising resistance and subsequent cooling of air flowing up the tower; and creating an optimum pressure differential between the inlet and outlet of the heat engine. Laminar flow rising air can accelerate to accommodate expansion on rising and so minimise the lateral cross section required for the tower section, thereby reducing the size and construction cost of the tower section.

The heat exchange modules may be formed from straight pipe sections joined by bend sections. Alternatively the modules may be formed from coiled or helical pipes which has the advantage that the hottest molecules of heat sources flowing through the pipes are forced towards the pipe surface thereby enhancing the flow of heat away from the waste products and into the passing air stream. Due to their higher cost than modules formed from straight pipe sections joined by bend portions, modules formed from coiled or helical pipes are most suitable for use in particular areas of the heat exchanger section, where for example a high rate of heat exchange is required in a certain portion of the transverse cross-section of the heat exchanger section. Modules made from straight pipe sections and bend portions have the advantage that they are cheaper to produce but are likely to be less efficient at transferring heat to the passing stream of air.

The modules may be formed in different shapes and sizes and/or made up of different lengths and/or numbers of pipes. This advantageously allows the modules to be formed and arranged such that they fill the maximum possible volume of the heat exchanger section in order to optimise the transfer of heat from the sources of heat to the air flowing through the heat engine. The modules may be custom designed to suit the properties of the fluid requiring cooling, such as volume, temperature, viscosity and density.

Preferably a compressor is provided having an inlet and an outlet, the inlet of the compressor being adapted to receive working fluid expanded through an expander of a power plant, the compressor for compressing the expanded working fluid, the outlet of the compressor being connected to the heat exchanger means of the condenser. Preferably the compressor is comprised of one or more compression pumps to induce condensation of the expanded steam by compression and, in doing so, release heat. This advantageously results in faster condensation of the working fluid in smaller space. Although compressor consumes energy, the effect of the pressurised condensing is an associated increase in the temperature of the air rising up through the heat engine, resulting in an increase in the pressure differential between the heat engine inlet and outlet and a faster rate of power generation by the turbines and associated generators. The result may allow a more compact, higher temperature heat engine requiring a smaller condenser that is less susceptible to changes in the ambient air temperature outside the heat engine, and prevailing weather conditions. It would also allow a much shorter tower to maintain the same pressure differential across the turbines compared with a system not having pressure pumps.

Two or more tower sections may be provided and coupled together so as to support one another. This would also allow each tower section to have a smaller volume than a single tower section capable of providing the same pressure differential.

BRIEF DESCRIPTION OF THE FIGURES

Preferred embodiments of the present invention will now be described, by way of example only, with reference to the accompanying figures, in which.

DETAILED DESCRIPTION OF PREFERRED EMBODIMENTS OF THE INVENTION

The invention will be described as applied to a conventional power plant, although the invention can also be applied to other industrial processes that generate waste heat.

Figure 1:
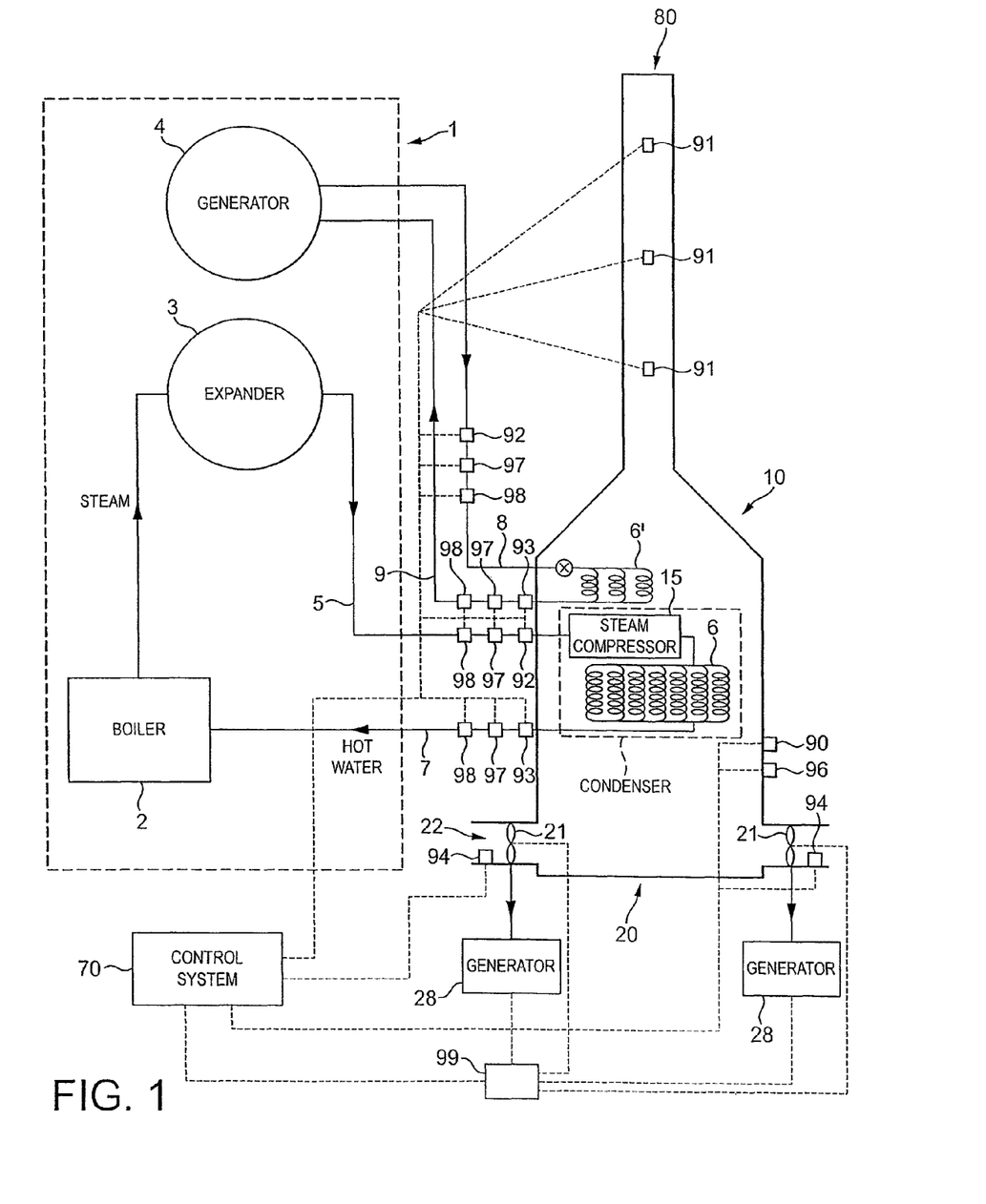
FIG. 1 is a schematic view (not to scale) of a power plant with a heat engine in accordance with the present invention.

Referring to FIG. 1, a power station 1 comprises a boiler 2 for heating water to create steam. The steam is used to drive a turbine 3 which is coupled mechanically to a generator 4. The pressure of the steam causes the turbine to rotate, which in turn drives the generator to generate electricity. The steam emerging from the turbine is passed through pipes 5 to a heat exchanger or condenser 6 in a heat engine 10 where it is cooled and/or pressurised and so condensed to form water. Pipes 7 return the water from the heat exchanger in the engine to the boiler where it is re-heated to produce steam and the cycle is repeated.

Heat from other heat sources in the power plant, such as the bearings of the turbine and generator, is also passed by a fluid, such as lubricating oil, in pipes 8 to a heat exchanger 6' in the heat engine where it is cooled before being returned through pipes 9.

Figure 2:
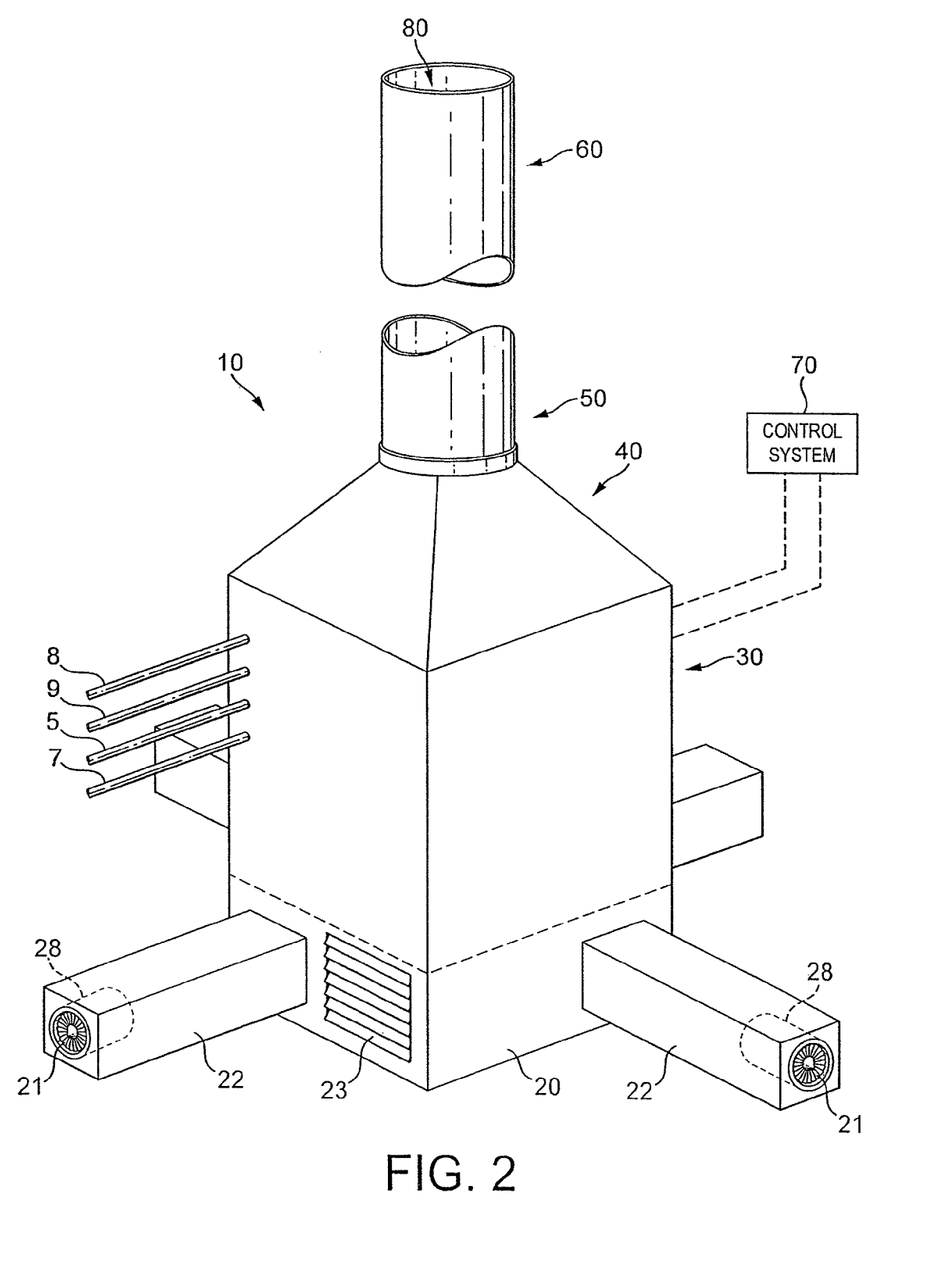
FIG. 2 is a schematic perspective view (not to scale) of a heat engine in accordance with the present invention.

A heat engine 10 for use with the otherwise conventional power plant of FIG. 1 or other industrial process generating sources of waste heat is shown generally in FIG. 2. The heat engine 10 includes a turbine section 20, a heat exchanger section 30 (which also provides part of, or the entirety of, the condenser 6 of the power station 1) and includes a funnel section 40, a laminar flow inducing section 50 and a tower section 60. The heat engine is managed by a control system 70 (described later and shown schematically in FIG. 9).

The turbine section 20 is positioned at the base of the heat engine 10 and includes a plurality of turbines 21 arranged in ducts 22 extending through the heat engine wall at the base of the heat engine. In this embodiment, the turbines and ducts are spaced uniformly around the periphery of the turbine section 20. Alternatively, the turbines may be positioned in any convenient and/or available location and air flowing through the turbines can be directed into the base of the heat engine by a duct or other suitable channel or conduit for air.

The ducts 22 provide flow paths for air passing from outside the heat engine into the turbine section 21. The turbines 21 are preferably ultra-low pressure turbines such that they can still be rotated by the flow of air into the turbine section when the pressure differential across the turbine is low. The type of turbines 21 should be selected to suit the particular application of the heat engine and therefore may alternatively be of another type, or a mixture of different types of turbines may be provided. Each turbine 21 drives a generator 28 for producing electricity as the turbines are turned.

A system of louvers 23 is provided which are operable by a louver actuation system, the control system 70 to allow air to bypass one or more turbines 21 and flow directly into the turbine section 20, or to restrict or shut off completely the flow of outside air into the turbine section.

In this embodiment, at least one turbine 21 has a rotor with variable pitch blades 24 such that the control system can vary the angle of the blades of the rotor and thereby vary the resistance to air passing through the turbine. This enables the blades to be feathered as required to provide the appropriate balance between the power generation and condenser cooling functions of the heat engine. The blade angle is adjusted using a known adjustment mechanism.

Figure 3:
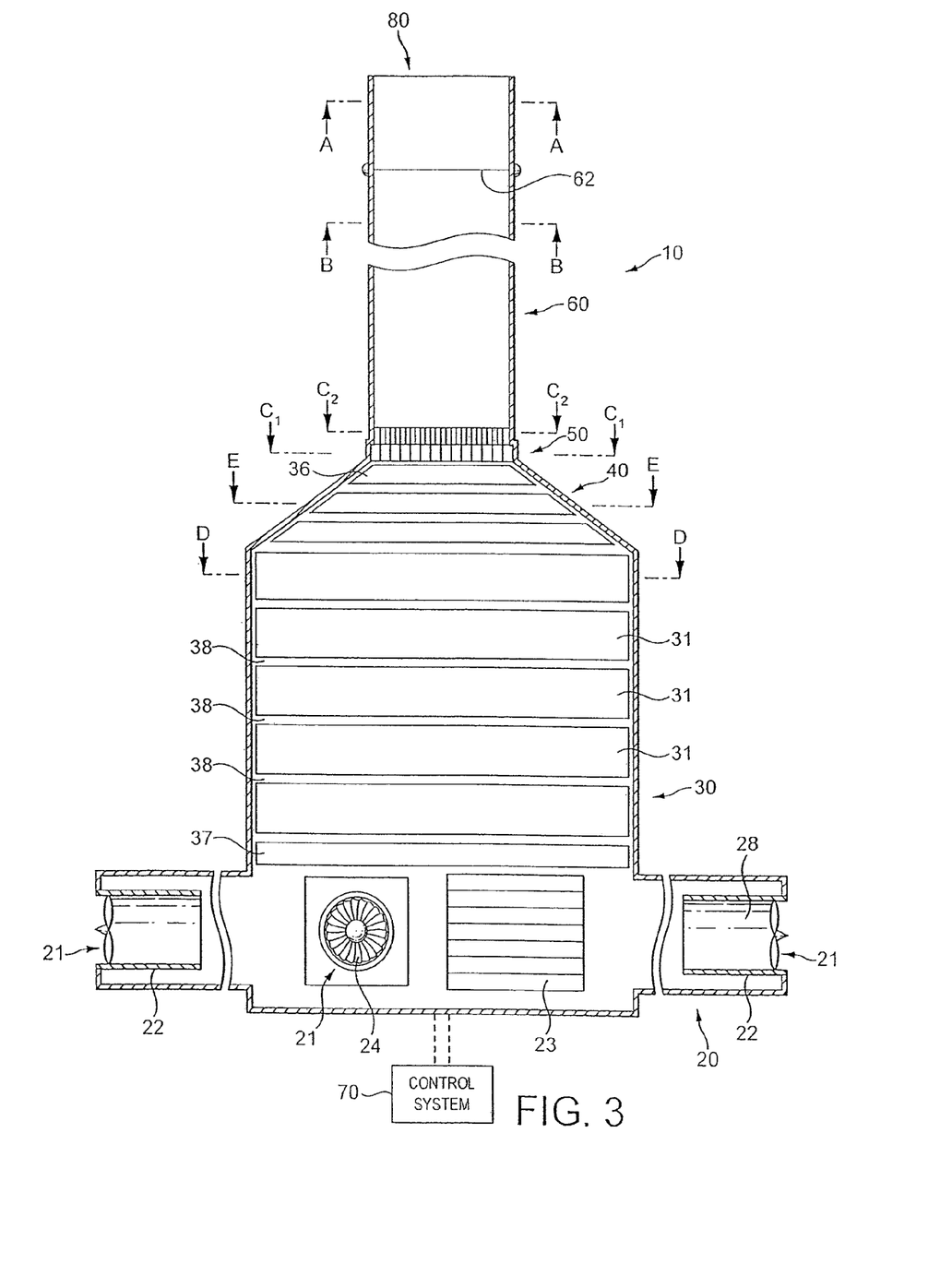
FIG. 3 is a vertical section through the heat engine of FIG. 2.

As shown in FIG. 3, the heat exchanger section 30 is positioned above turbine section 20 and receives air flowing upwardly from turbine section 20. The heat exchanger section 30 includes a plurality of radiator modules 31 (referred to throughout this description as "modules") through which sources of waste heat from a power plant, such as the steam expanded through the steam turbines, bearing coolants and other working fluids or coolants that carry heat, may be circulated and condensed and/or cooled as required by heat exchange with cooler outside air flowing into the heat exchanger section from the turbine section.

The modules 31 collectively form a large radiator for heating air inside the heat exchanger section 30. One or more of the modules through which the expanded working fluid of the power plant is circulated acts as a condenser 6 for condensing the working fluid expanded through the expander of the power station. Other modules act as heat exchangers 6' to cool other sources of waste heat from the power plant. Modules 31 may, in the case of a newly constructed thermal power plant, be the sole condensing means of the power plant's cooling system. In the case of an existing power plant retrofit with the heat engine of the present invention, modules 31 may be the sole or an additional condenser of the thermal power plant cooling system, as appropriate. It is envisaged that the heat exchanger section of the heat engine will be of the order of 100 meters tall, as air cooling of waste heat sources flowing through a condenser is known to be less efficient than water cooling the waste heat sources. The particular dimensions of the heat exchanger section can of course be tailored to the specific application of the heat engine and the available physical space and budget constraints.

In the preferred embodiment, modules 31 are composed of thin-walled pipes 32 and positioned within the heat exchanger section within the stream of air flowing from the turbine section such that the cool incoming air rising up through the heat engine flows across the surfaces of the pipes and receives heat from the source of heat flowing inside the pipes. Alternatively, the heat engine may be configured so that the expanded steam or other heated fluid flows across the surface of one or more modules through which cold, incoming air or water is passed to condense the steam or cool the working fluid as in a traditional condenser.

The individual modules 31 are stacked on top of each other such that they are positioned at different heights in the heat exchanger section. The modules are also distributed substantially across the entire transverse cross-sectional area of the heat exchanger section such that a maximum pipe surface area is presented to the air flowing through the heat exchanger section 30 from the turbine section 20.

Modules 31 may have a circular, rectangular, hexagonal or other configuration and may be an array of different shapes and sizes. Modules 31 may also be composed from different numbers and/or lengths and/or arrangements of pipes such that the modules can be designed and arranged to fit within the heat exchanger section in an appropriate number and manner for the volume and temperature of the sources of waste heat that require condensing and/or cooling.

Figure 7:
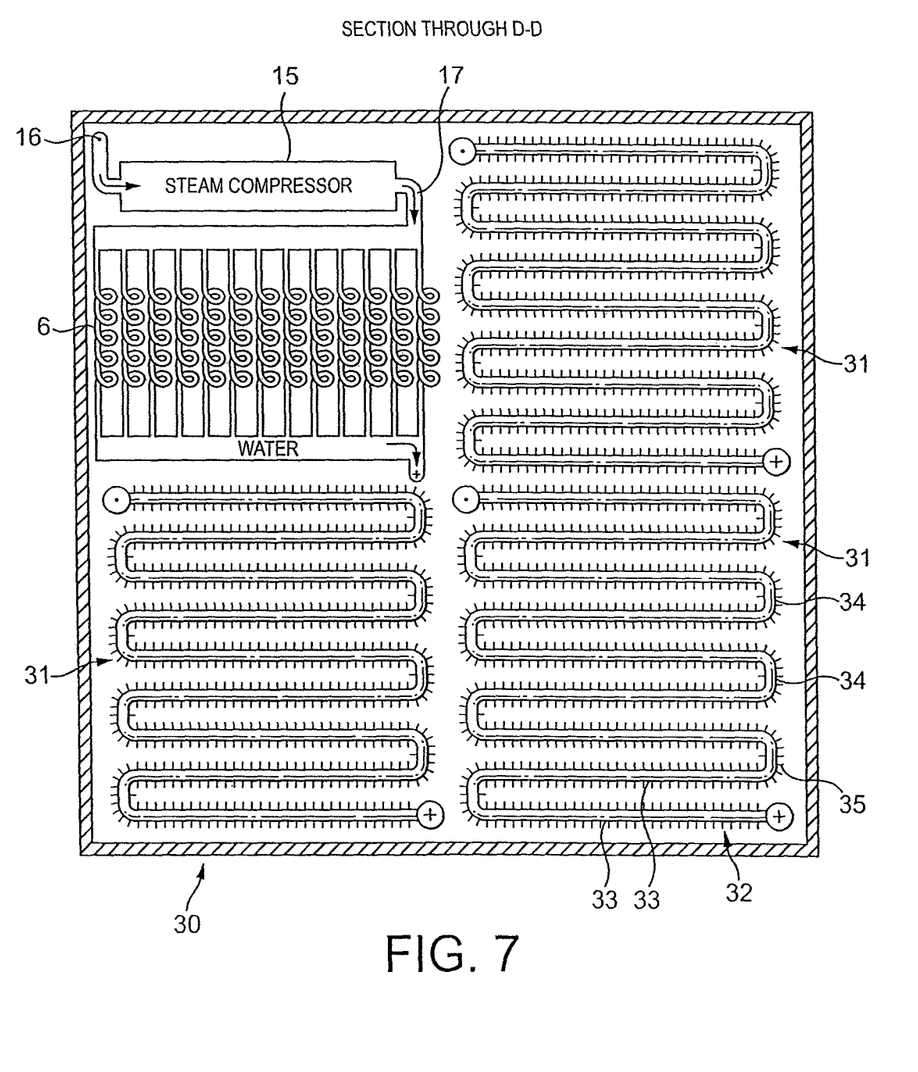
FIG. 7 is a section through the line D-D of FIG. 3.
Figure 8:
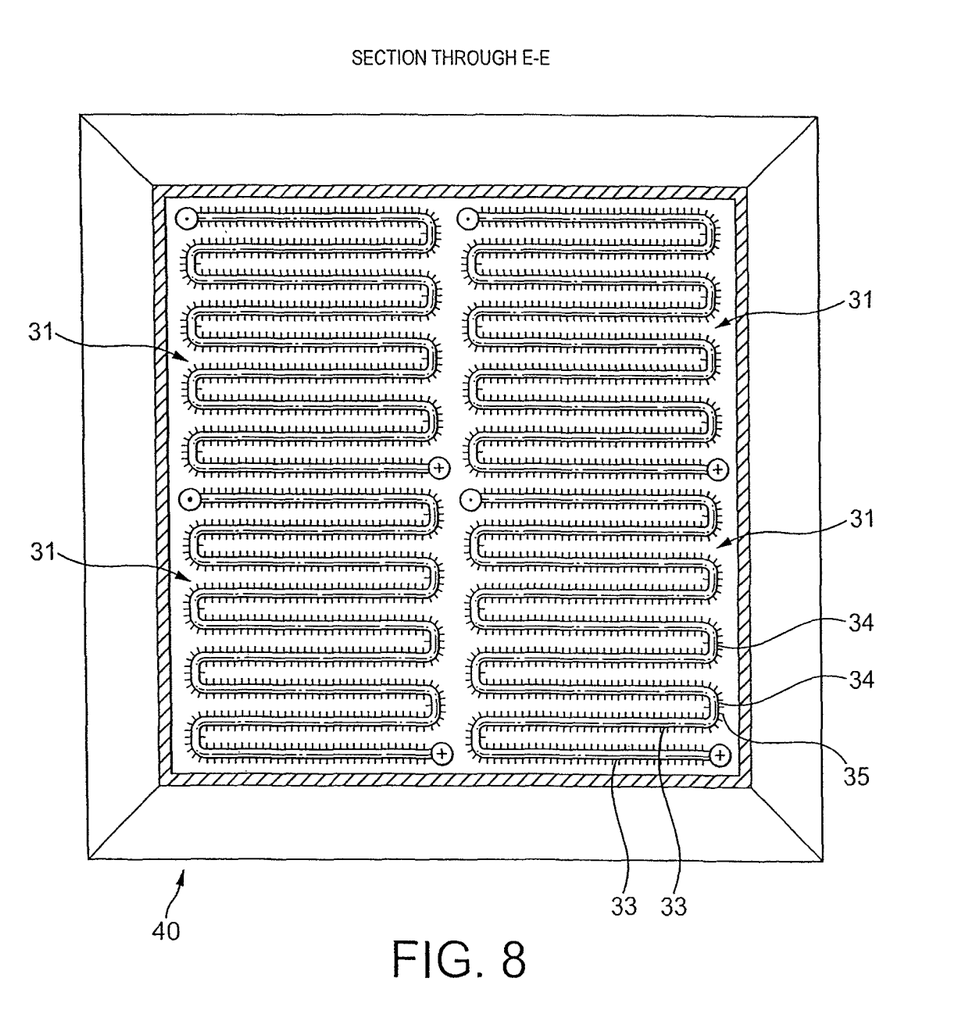
FIG. 8 is a section through the line E-E of FIG. 3.

As shown in FIG. 7, modules 31 are preferably formed of parallel straight pipe sections 33 connected by bend sections 34 forming meandering flow paths for the expanded steam and other sources of heat. Alternatively, the modules may be formed from joined or continuously formed coiled or helical pipes. When formed as coiled/helical pipes, the modules are preferably formed from tight spiral/helical coils, each of a diameter much smaller than the cross section dimension of the heat exchanger section, in order to increase the overall surface area of the module presented to the air flowing through the heat exchanger section 30. The pipe sections can include cooling fins 35.

The transverse cross-sectional area of the heat exchanger section is greater than that of the laminar flow inducing 50 and tower sections 60 above it so that, despite the presence of the modules within the heat exchanger section which reduce the through flow area, the through-flow cross sectional area available for air to flow up through the heat exchanger is substantially the same as the through-flow cross sectional area in the tower section of the heat engine. This prevents any significant throttling down effect that might otherwise cause unwanted resistance to the flow of air through the heat engine.

The modules 31 at various heights of the heat exchanger are intended to work at a particular temperature that is governed by the source, or combination of sources, of waste heat supplied to that module. Insulated pipes 5 and 8 supply the various sources of waste heat from sites around the thermal power plant to the inlet of the appropriate module or modules. In this embodiment two sources of waste heat are shown—the steam from the turbines 3 of the power station and the waste heat from the bearings are fed through pipes 5 and 8 respectively—but other sources of waste heat may be utilised and fed into the heat exchanger at the level appropriate to their temperatures.

The sources of waste heat are supplied to modules 31 in such a way that the highest temperature waste heat source is fed to the uppermost module 36 or modules in the heat exchanger and the lowest temperature waste heat source is fed to the lowermost module 37 or modules. This arrangement ensures the most effective transfer of heat from the sources of waste heat to the air flowing up through the turbine and heat exchanger sections to optimise the power generation and condenser cooling functions of the heat engine. Other sources of waste heat at intermediate temperatures may be fed in at intermediate levels in the module stack.

Preferably, each module 31 is isolated from the other modules such that they are individually controllable by the control system 70. This prevents cross-contamination of waste heat sources so that, for example, a de-mineralised water working fluid is not contaminated by other working fluids, cooling fluids or other sources of heat.

The modules 31 may be physically and/or fluidly connected together into heat exchanger module sub-sections or may be fluidly connectable during operation or offline reconfiguration of the heat engine to form subsections, each subsection being individually controllable by the control system 70. This allows the control system to respond to changes in the ambient air temperature and prevailing weather conditions by designating a larger or smaller number of modules to condense the expanded thermal power plant working fluid.

The modules or heat exchanger subsections at different levels are spaced apart vertically from one another to allow access channels 38 between some or all module levels for maintenance.

As further shown in FIG. 3, the upwardly tapering funnel section 40 of the heat exchanger section 30 provides a smooth and gradual transition for air rising through the heat exchanger section 30 which has a larger transverse dimension, into laminar flow inducing section 50 having a smaller transverse dimension.

Figure 6A:
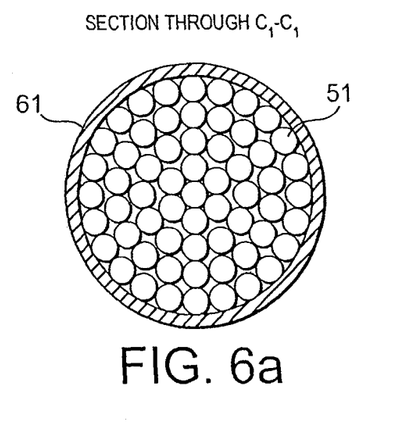
FIG. 6a is a section through the line $C_1$-$C_1$ of FIG. 3.
Figure 6B:
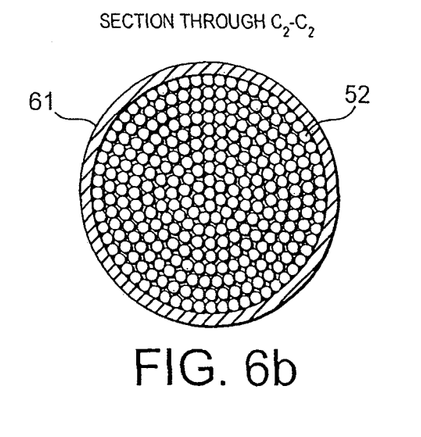
FIG. 6b is a section through the line $C_2$-$C_2$ of FIG. 3.

The laminar flow inducing section 50 is positioned above funnel section 40. As shown in FIGS. 6a and 6b, this section comprises a first array 51 of, thin-walled, open-ended, vertically aligned pipes. Preferably the pipes are four meters long and have 0.5 meter diameters. A second array 52 of thin-walled, open-ended, vertically aligned pipes is positioned above the first array. Preferably the second array consists of two meter long pipes having 0.25 meter diameters.

The pipe arrays are arranged to fill substantially the entire lateral cross section of laminar flow-inducing section 50. Pipe arrays 51 and 52 ensure that air flowing from heat exchanger section 30 through funnel section 40 has laminar flow characteristics when it enters tower section 60. This helps to maintain laminar flow of air rising up tower section 60 in order to reduce heat loss through the wall of the chimney and minimise friction and resistance to the flow of air.

Figure 4:
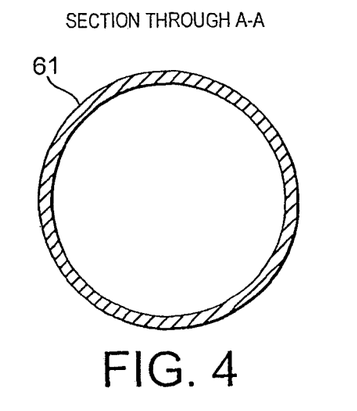
FIG. 4 is a section through the line A-A of FIG. 3.

The tower section 60 is positioned above laminar flow-inducing section 50 and defines a flow path for air flowing from laminar flow inducing section 50 to an outlet 80 at the top of the heat engine. The tower section 60 comprises a tower 61. The tower 61 has a vertical, airtight wall 61 and may be insulated to minimise the flow of heat energy away from the air by conduction through the wall. The tower 61 preferably has a smooth, cylindrical internal surface (FIG. 4) to minimise resistance to the flow of warmer air up the tower and thereby maximise the pressure differential across the turbines 21.

The tower 61 is designed to enclose a warm, light column of rising air having a lower density than the atmospheric air outside the heat engine 10. This provides an enhanced pressure differential between the inlet and outlet of the tower for drawing cooler outside air into the turbine section and up through the heat engine. The effect of the enhanced pressure differential is to force air through the heat engine sections more effectively than the natural chimney effect of a traditional cooling tower or chimney which results from the draw created by air flowing across the top of the tower or chimney.

The height of tower section 61 is determined by the pressure differential required to drive the turbines 21 positioned in turbine section 20 at the base of the heat engine and is dependent on the number, arrangement and type of turbines. A taller tower will provide a greater pressure differential across the tower section wall and thereby generate a greater flow rate of air up the heat engine, capable of greater power generation by the turbines and more effectively air-cooling the modules 31 in the heat exchanger section. The tower dimensions will inevitably be a compromise between the desired heat engine power generation function and condenser cooling function, as well as a wide array of environmental, economic and social considerations.

The tower is preferably dimensioned to provide a pressure differential of 1 to 2 psi. This is likely to require the tower 61 to be in the order of 300-500 meters tall. An even taller tower may be desirable. However, a tower 61 shorter than 500 meters may also be appropriate for certain applications with a lower pressure differential requirement, or where a taller tower cannot be provided for economic or environmental reasons. Alternatively, two or more tower sections may be provided. These may be coupled together to bind each other and provide structural rigidity.

Figure 5:
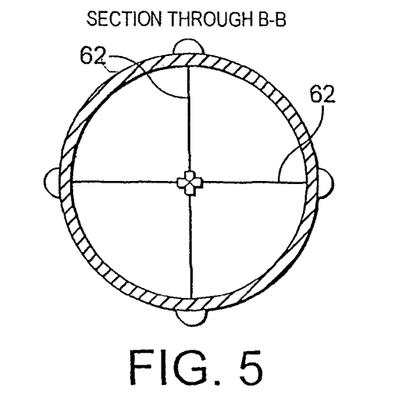
FIG. 5 is a section through the line B-B of FIG. 3.

The interior of tower 61 is designed to minimise resistance to the flow of air up the tower. As shown in FIG. 5, stays or ties 62, which may be steel cables, may be provided at height intervals (for example 50 meter intervals) within the tower to bind and enhance the rigidity of the tower. The stays or ties may be formed as, or covered by, an aerodynamically neutral profile, to minimise drag and maintain laminar flow.

The transverse cross-sectional flow area of the various sections of the heat engine available for the flow of rising air is substantially constant so that there is no significant throttling down effect and therefore minimal resistance to the flow of air up the heat engine. In particular, the transverse cross-sectional area of the heat exchanger section 30 available for the flow of air is preferably the same as, or very slightly larger than, the transverse cross sectional flow area of the tower section 60.

Figure 9:
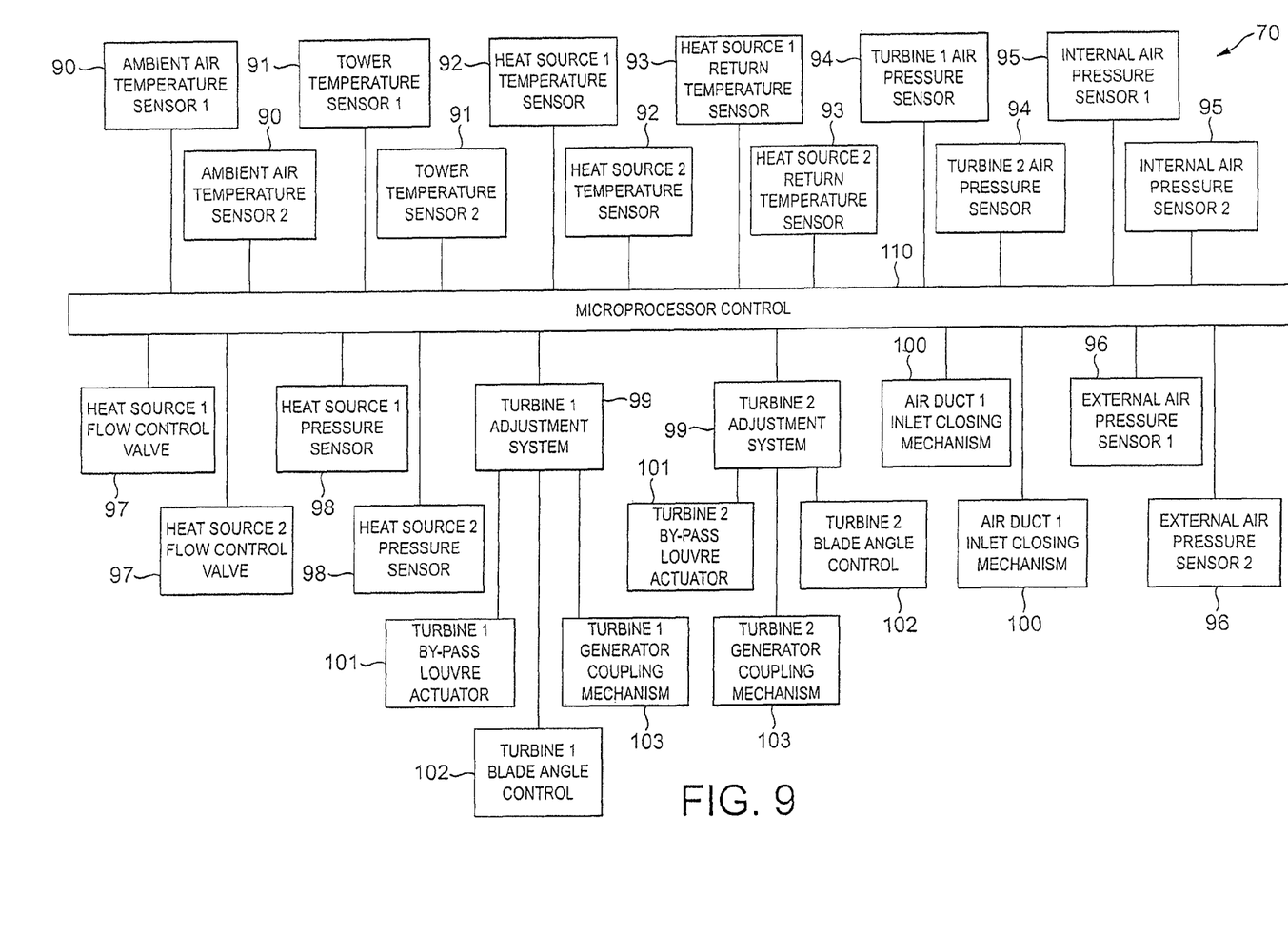
FIG. 9 is a schematic diagram of the control system for the heat engine of FIGS. 2 to 8.

The control system 70 for the heat engine is illustrated diagrammatically in FIG. 9. By way of example only, many of the components are shown in pairs. It will be apparent that any number of each component can be provided as required by the particular configuration of the heat engine.

The control system comprises: ambient air temperature sensors 90, tower temperature sensors 91; heat source temperature sensors 92; heat source return temperature sensors 93; optional turbine air pressure sensors 94; optional internal air pressure sensors 95; optional external air pressure sensors 96; heat source flow control valves 97; optional heat source pressure sensors 98; turbine adjustment systems 99; and turbine air duct closing systems 100. Each turbine adjustment systems 99 comprises: a turbine by-pass louver actuator 101; a turbine blade angle control actuator 102; and a turbine generator coupling system 103. All control system components are connected to a microprocessor 110 for providing microprocessor control.

Ambient air temperature sensing devices 90 are positioned externally of the heat engine and transmit outside air temperature measurements to microprocessor 110. Tower temperature sensors 91 are positioned at height intervals in the tower section 60 and transmit air temperature measurements to microprocessor 110.

Heat source temperature sensors 92 are positioned in heat source flow paths 5 and 8 and transmit heat source temperature measurements to microprocessor 110. Heat source return temperature sensors 93 are positioned in heat source return paths 7 and 9 and transmit heat source temperature measurements to microprocessor 110.

Optional turbine air pressure sensors 94, internal air pressure sensors 95, external air pressure sensors 96, and heat source pressure sensors 98 are positioned proximate the turbines 21 in the turbine ducts, at various locations internally and externally of the heat engine and in the heat source feed and/or return paths respectively. The optional pressure sensors monitor the interior and exterior pressure and feed back data to the microprocessor 110 enhancing the ability of the control system to manage the flow of outside air into and up through the heat engine. It is envisaged that pressure measurements may be used by the control system for confirmation of the required operating parameters as determined by the temperature measurements and also for additional fine tuning of the heat engine operation.

The heat source flow control valves 97 control the flow direction and/or flow rate of the various heat sources.

The turbine adjustment systems 99 enable the control system to vary the number of turbines in operation and controlling the rate of generation of electrical power by selectively opening or closing the louvers 23 using the turbine by-pass louver actuator 101, varying the turbine blade pitch angle using the turbine blade angle control actuator 102 and selectively coupling and de-coupling the turbine and associated generators using turbine generator coupling system 103. The volumetric flow rate of air through the turbine ducts is controllable using turbine duct closing systems 100. A particular duct can also be isolated for maintenance by decoupling the turbine generator and/or closing the associated turbine duct.

Microprocessor 110 enables the control system to monitor heat engine operating conditions and control the flow of air and the various heat sources so as to ensure appropriate heat engine operating characteristics for current temperature of the expanded working fluid and other heat sources from the power plant. The control system is used to manage the flow of air through the heat engine by varying the number of turbines in operation and/or the flow rate of air through the heat engine, as discussed further below.

In operation, the heat engine of the invention provides a dual function. Pumping sources of waste heat from the thermal power plant through the modules 31 causes the modules to act collectively as a large radiator for heating air in heat exchanger section 30. This maintains a column of warm, light air having a lower density than the atmospheric air outside the heat engine. This column of light air rises up through the heat exchanger section 30, funnel section 40, the laminar flow inducing section 50 and the tower section 60. This causes colder, denser, atmospheric air to be drawn into the turbine section 10 at the base of the heat engine to replace the rising air heated by heat exchanger section 30. As the air drawn into the heat engine forces its way past the turbines it rotates the turbines 21 in turbine section 10 which drive generators 28 to generate electricity. This results in increased net output of electrical energy from the calorific value of the fuel used to operate the thermal power plant.

The colder, atmospheric air flowing into the heat engine at the turbine section passes into the heat exchanger section 30 and flows across the surface of the pipes forming the modules 31 through which the expanded steam and other sources of waste heat from the thermal power plant are circulated at a variety of different temperatures. One or more of the modules may therefore act as the sole, or an additional, condenser of the power plant by condensing the expanded steam by heat exchange with cooler outside air before it is returned to the boiler. Other modules can also be used to condense and/or cool other sources of waste heat produced by the thermal power plant.

Coupling the heat engine to the power plant so that the highest temperature heat sources are circulated through the uppermost modules and the lowest temperature heat sources are circulated through the lowermost modules, ensures that the cooler ambient air forcing its way into the heat engine at turbine section 20 and into heat exchanger section 30 is progressively heated up by heat exchange with the waste heat sources flowing through the modules. As the incoming atmospheric air rises up through the heat exchanger section, its temperature remains lower than that of the waste heat sources flowing through the upstream modules 31 so that the incoming air stream has a cooling effect on all of the modules in the heat exchanger section and so that the waste heat sources continue to heat the air as it rises towards the tower section.

The heat engine therefore acts both as an additional electrical power generation device and a condenser/cooler for the thermal power plant with which it forms a hybrid arrangement. Maintaining a sufficient pressure differential between the air inside the heat engine and the surrounding atmospheric air is important to the efficient operation of the heat engine as air cooling of the heat exchanger modules is less efficient than traditional water cooling. As described above, this necessitates that the tower section 60 is of sufficient height to provide the required pressure differential required by the waste heat released thermal power plant with which it operates.

The heat engine operates on the principle of a trade off between the desired rate of condensing/cooling of the expanded steam and sources of waste heat circulated through the modules and the desired rate of additional electrical energy generation. The control system is used to balance these functions as will now be described.

The control system is used to control the flow rate and therefore the energy generation and condenser cooling rates of the atmospheric air passing through the heat engine so that the sources of waste heat flowing through the modules, particularly the expanded working fluid, are condensed and returned to the thermal power plant at an appropriate temperature. In particular, the heat engine is controllable such that the thermal power plant working fluid is condensed and returned to the boiler of the thermal power plant at the required temperature so that minimal energy is required to reheat and vaporise the working fluid in the power plant boiler.

On a warm day when the incoming ambient air less effectively cools the waste heat sources flowing through the modules, the control system reacts to temperature and/or pressure data from the temperature and/or pressure measurement devices 91, 92, 93, 94 by fully or partially opening louvers 23 to control the number of turbines 21 in operation and/or by feathering the blades of the rotor of one or more of the turbines. This reduces the resistance to air flowing into the turbine section, giving priority to the condensing/cooling function of the heat engine.

On a colder day when the incoming air more effectively condenses the working fluid and cools the other waste heat sources, the control system can bring additional turbines into operation by closing the louvers 23 which, when open allow the air to bypass the turbines and/or by changing the pitch of the rotor blades, allowing the incoming air to drive a greater number of turbines and increase the rate of power generation.

If there is a fault requiring attention, when servicing is required, or when it is desirable to eliminate all resistance to the flow of air by the turbines, additional louvers in the wall of the heat engine may be opened to enable incoming air to flow directly into turbine section 20 and by pass some or all of the turbines completely.

The control system may also be used to control the type and flow rate of a particular source of waste heat flowing into a particular module or module subsection from the thermal power plant. When the ambient air temperature is such that it is not appropriate to introduce one or more particular sources of heat to the heat engine, such as a bearing coolant at a particularly high temperature, this heat may instead be dissipated in an alternative manner, for example by re-directing the heated fluid through a known water-cooled condenser. Condensing the expanded steam at the appropriate temperature is the most important function of the heat engine; other waste heat sources can be introduced to, or diverted from, the heat exchanger section as required to maintain the required working fluid condensation temperature and enable additional electrical power to be generate when possible.

On a warmer day when the cooling effect of the incoming air is reduced, the control system may be used to couple together additional modules or module subsystems so that expanded steam passes through more than one module. On a colder day, fewer modules or module subsystems may be need to be allocated by the control system to condensing the expanded steam. The heat engine may therefore have spare capacity in the form of modules or module subsystems that can optionally be brought into operation by the control system. The heat engine can of course be designed and constructed according to a power plant heat audit and can be tailored to cope with the expected cooling requirements of a particular facility.

It is envisaged that it will also be possible for a target module or module subsystem to which sources of waste heat are delivered to be changed by the control system during operation or during offline reconfiguration of the heat engine to compensate for changes in the ambient air temperature and particular power plant operation requirements.

As the heat engine operates in a hybrid arrangement with the power plant, if a particular part of the power plant that typically yields a high temperature fluid is not in operation, one or more of the modules intended to receive this heat source may be shut off, while alternative or the remaining sources of waste heat are used to enable the heat engine to continue functioning.

If the power plant heat audit is carried out effectively in the heat engine design phase, the requirement to vary the configuration of the modules during operation or during shut down and reconfiguration of the heat engine should be minimised.

The control system may be used to optimise the output of the heat engine in the following ways.

In appropriate conditions where sources of waste heat that have been circulated through one or more modules in the heat exchanger section 30 still retain some residual heat, these waste heat sources may then be used to heat water for use by surrounding buildings.

On a warm day when there is little demand for heating surrounding buildings, the heat engine of the invention can be used to generate 1 additional power at a faster rate and thereby improve the overall efficiency of the thermal power plant. On a cold day when demand for hot water and heating is significant, the heat engine of the invention may be used to generate additional power at a slower rate and provide a greater volume of hot water for surrounding buildings.

A number of alternatives to the basic heat engine construction are also envisaged as will now be discussed.

The heat engine may receive waste heat from a variety of other thermal power plant working fluids such as ammonia and Freon, hydrogen which may be used to cool high pressure turbines in thermal power plants, and oil which is often used as bearing coolants.

Heat recaptured from the power plant flue gases in the cleaning and filtering process could, in appropriate conditions, be passed through one or more of the heat exchanger modules or modules subsystems to provide additional heating of air in the heat exchanger section.

When the cooling effect provided by atmospheric air forcing its way into the heat engine is not sufficient to cool waste heat sources circulating through the modules, additional pipes containing cold water may be used to trigger condensation of the expanded working fluid and condensation and/or cooling of any other waste heat sources. In this alternative, one or more of the modules would operate in a similar way to a conventional wet condenser. The cold water heated by heat exchange with the waste heat source could then be circulated through one or more lower radiator modules at the appropriate level for the temperature of the water in order to preheat air forcing its way into the heat engine and reduce the temperature of the waste water allowing it to be reused.

Alternatively, some or all of the heat exchanger modules or module subsystems of the heat may be provided as a hybrid wet and dry cooling system. The relevant module or modules could have a split pipe configuration with an internal wall separating cooling water flow from the heat source flow. Alternatively a larger diameter external pipe through which the expanded steam flows may surround a smaller diameter internal pipe though which cooling water flows. The dual pipe configuration has the advantage of being cheaper to manufacture. These cooling water and heat sources flows may optionally be arranged in common or counter-flow directions.

The expanded steam may alternatively or additionally be condensed under the application of pressure. This would result in higher temperature condensed water being returned to the power plant boiler thereby reducing the energy required to reheat and vaporise the water to continue the power generation cycle of the thermal power plant. Condensing the expanded steam under pressure would require energy but would advantageously allow greater control over the condensation of the expanded steam and compensation for changes in the ambient air temperature and power plant operating conditions. It would also lead to greater air temperatures in the tower section due to the release of latent heat during condensation. It would also permit a reduction in the size of the heat exchanger section.

The means for pressurising the condensed working fluid, for example a pump, is preferably positioned in the heat exchanger section. For this purpose, the expanded steam from the expander 3 of the power plant is delivered through the pipe 5 to an inlet 16 of a steam compressor 15 (see FIGS. 1 and 7) made up of one or more compression pumps, before being passed from an outlet 17 of the compressor through the pipes of the heat exchanger/condenser 6. The compression of the steam by the steam compressor 15 condenses the steam into water and raises the temperature of the fluid medium. The heat is removed from the fluid by the heat exchanger 6 so that it remains in the liquid phase as it returns to the boiler.

The heat exchanger section and the pressure at which the expanded steam is condensed can of course be designed specifically for the power generation facility with which it is to be used in a hybrid arrangement. Increasing the pressure of the steam will result in condensation and an associated increase in temperature of the fluid. Expanded steam from the low pressure turbine 3 of the power plant 1 at 40 degrees Centigrade could therefore be condensed under pressure in a lower module 31 to raise the temperature of the condensed water to, for example 80 degrees Centigrade, which is then recirculated through an upper module 31 at the higher temperature before being returned to the power plant. Although this requires some energy, it is presently envisaged that the additional heat energy in the condensed water will be approximately four times the energy required to drive the pump resulting in a net 'energy profit'. This will be aided by the pressure differential governed by the height of the tower and the low resistance to air flow and insulation of the tower. This result would be a reduction in the energy required to preheat the working fluid water in the boiler 2 of the power plant and hence a net increase in thermal power plant efficiency.

Where the heat engine is to be used in hybrid arrangement with an existing thermal power plant, one or more of the heat engines of the present invention will be installed alongside the existing wet cooling towers of the thermal power plant. The existing wet cooling towers may then be used in parallel with the one or more heat engines of the invention and the control system can be used to control the contribution of the heat engine relative to the existing wet cooling towers in response to the ambient air temperature and demand for additional electricity generation and/or heating. This arrangement would not require re-plumbing of the thermal power plant but rather additional plumbing.

Where the heat engine is incorporated into a new power plant, one or more of the heat engines of the present invention may be used as the sole condenser cooling means and can be designed and sized according to the cooling requirements of the particular power plant. Particularly when the heat engine is designed only for air-cooling waste heat sources from the associated power plant, the power plant with hybrid heat engine can more easily be built and operated in a built-up area or other area where a supply of cooling feed water is unavailable.

What is claimed is:

1. A heat engine for generating power from heat sources, said heat engine comprising:
    a turbine section, said turbine section having at least one air inlet and at least one rotor, wherein said at least one rotor is positioned to be rotated by air flowing through said at least one air inlet;
    at least one generator coupled to said at least one rotor for generating power as the at least one rotor is rotated;
    at least one tower section, said at least one tower section having an air outlet, wherein said at least one tower section is positioned above the turbine section and arranged to receive air flowing from said turbine section and to deliver the air flowing from said turbine section to said air outlet;
    a heat exchanger section positioned between said turbine section and said at least one tower section and comprising a heat exchanger, wherein said heat exchanger is adapted to be connected to at least one of the heat sources and configured to transfer heat from the at least one of the heat sources to air flowing from said turbine section into said at least one tower section;
    said heat exchanger including a plurality of modules including at least one upper module, and at least one lower module positioned below the at least one upper module, wherein said plurality of modules is arranged to receive heat from the heat sources of heat at different temperatures, wherein said at least one upper module is adapted to receive heat from at least one of the heat sources at a higher temperature than a temperature of heat received by the at least one lower module;
    wherein said plurality of modules is positioned across a transverse cross sectional area of said heat exchanger section;

wherein the transverse cross sectional area of the heat exchanger section is greater than a transverse cross sectional area of the at least one tower section.

2. The heat engine according to claim 1, wherein a transverse through-flow area of the heat exchanger section is the same as a transverse through-flow area of the at least one tower section.

3. The heat engine as claimed in claim 1, including an adjustment system for adjusting an impedance of the turbine section to air entering through the turbine section and flowing up through the heat exchanger section and into the at least one tower section.

4. The heat engine as claimed in claim 3, wherein the at least one rotor of the turbine section includes variable pitch blades and the adjustment system includes a blade pitch adjustment system for adjusting a pitch of the variable pitch blades.

5. The heat engine as claimed in claim 3, wherein the adjustment system includes at least one selectively openable aperture through which air can enter the turbine section without passing the at least one rotor.

6. The heat engine as claimed in claim 3, wherein the adjustment system includes a coupling system for selectively coupling the at least one rotor to the at least one generator.

7. The heat engine as claimed in claim 3, wherein the at least one generator comprises a plurality of generators and the at least one rotor of the turbine section comprises a plurality of rotors, the adjustment system comprising a coupling system for selectively coupling each rotor of the plurality of rotors to a respective generator of the plurality of generators.

8. The heat engine as claimed in claim 3, including a control system, said control system including sensors for detecting a temperature of the heat sources, the control system altering the adjustment system according to the temperature of the heat sources so as to control a flow rate of air flowable through the at least one air inlet to the air outlet.

9. The heat engine as claimed in claim 1, in which the at least one tower section is of a height sufficient to produce a pressure differential which draws air into the at least one air inlet of the turbine section.

10. The heat engine as claimed in claim 9, wherein the at least one tower section is between 300 and 500 meters tall.

11. The heat engine as claimed in claim 1, wherein at least one of the heat sources is an expanded working fluid expanded through an expander of a power generation plant.

12. The heat engine as claimed in claim 1, wherein at least one of the plurality of modules comprises at least a part of a condenser of a cooling system of a power generation plant.

13. The heat engine as claimed in claim 1, wherein the at least one rotor comprises at least one turbine.

14. The heat engine as claimed in claim 13, wherein the at least one turbine is operable at a pressure differential of 1 to 2 psi.

15. The heat engine as claimed in claim 14, wherein the at least one turbine comprises a plurality of turbines and wherein at least one turbine of said plurality of turbines has adjustable blades.

16. The heat engine as claimed in claim 13, wherein the at least one turbine comprises a plurality of turbines, wherein each turbine of said plurality of turbines is positioned within a respective duct of a plurality of ducts, wherein said plurality of ducts is spaced circumferentially around the turbine section, wherein the at least one air inlet is a plurality of air inlets, with each duct of the plurality of ducts having a respective air inlet of the plurality of air inlets.

17. The heat engine as claimed in claim 16, including an air duct closing system for selectively closing at least one air inlet of the plurality of air inlets.

18. The heat engine as claimed in claim 1, including a tapering funnel section between the heat exchanger section and the at least one tower section for funneling air from the heat exchanger section into the at least one tower section.

19. The heat engine as claimed in claim 1, including a laminar flow inducing section between the heat exchanger section and the at least one tower section, said laminar flow inducing section including means for inducing laminar flow of air flowing from the heat exchanger section into the at least one tower section.

20. The heat engine as claimed in claim 19, wherein the laminar flow inducing means comprises one or more pipe arrays, each of the one or more pipe arrays formed as a plurality of parallel straight pipe sections.

21. The heat engine as claimed in claim 1, wherein the plurality of modules are formed from straight pipe sections joined with bend sections to form flow paths for the sources of heat.

22. The heat engine as claimed in claim 1, wherein the plurality of modules are formed from coiled pipes to form flow paths for the sources of heat.

23. The heat engine as claimed in claim 1, wherein the plurality of modules are isolated from one another to segregate the heat sources.

24. The heat engine as claimed in claim 1, wherein the at least one tower section comprises a plurality of tower sections arranged so as to support one another.

25. The heat engine as claimed in claim 1, including a control system, wherein the control system includes temperature measurement devices positioned inside the at least one tower section, positioned inside the modules and positioned outside the heat engine.

26. The heat engine as claimed in claim 25, wherein the control system includes a plurality of pressure measurement devices for measuring air pressure inside and outside the heat engine.

27. A power plant comprising: a heat engine as claimed in claim 1, a boiler, a turbine, and another generator, wherein working fluid expanded through the turbine provides heat for the heat engine.

28. The heat engine according to claim 1, further comprising a compressor with a compressor inlet and a compressor outlet, wherein the compressor inlet is adapted to receive working fluid expanded through an expander of a power plant, wherein the compressor is adapted to compress the working fluid expanded through the expander of the power plant, and wherein the compressor outlet is connected to the heat exchanger of the heat exchanger section.

29. The heat engine as claimed in claim 1, further including:
  an adjustment system for adjusting an impedance of the turbine section to air entering through the turbine section and flowing up through the heat exchanger section and into the at least one tower section; and
  a control system, said control system including sensors for detecting a temperature of the heat sources, the control system altering the adjustment system according to the temperature of the heat sources so as to control a flow rate of air flowable through the at least one air inlet to the air outlet.

30. A heat engine for generating power from heat from expanded steam from a power plant operating a steam cycle, said heat engine comprising:
- a turbine section, said turbine section having at least one air inlet and at least one rotor, wherein said at least one rotor is positioned to be rotated by air flowing through said at least one air inlet;
- a generator coupled to said at least one rotor for generating power as the at least one rotor is rotated;
- at least one tower section, said at least one tower section having an air outlet, wherein said at least one tower section is positioned above the turbine section and arranged to receive air flowing from said turbine section and to deliver the air flowing from said turbine section to said air outlet;
- a heat exchanger section positioned between said turbine section and said at least one tower section and comprising a heat exchanger,
- a compressor with a compressor inlet and a compressor outlet, wherein the compressor inlet of the compressor is adapted to receive expanded steam from the power plant, and wherein the compressor is adapted to compress the expanded steam from the power plant to form water,
- wherein the compressor outlet of the compressor is connected to the heat exchanger;
- wherein said heat exchanger is configured to transfer heat from the water to air flowing from said turbine section to said at least one tower section.

31. The heat engine according to claim 30, in which said heat exchanger includes a plurality of modules including at least one upper module, and at least one lower module positioned below the at least one upper module, wherein said plurality of modules is arranged to receive heat from sources of heat at different temperatures, wherein said at least one upper module is adapted to receive heat from at least one of the sources of heat at a higher temperature than a temperature of heat received by the at least one lower module.

32. The heat engine according to claim 31, in which said plurality of modules are positioned across a transverse cross sectional area of said heat exchanger section.

33. The heat engine according to claim 30, including an adjustment system for adjusting an impedance of the turbine section to air entering through the turbine section and flowing up through the heat exchanger section and into the at least one tower section.

34. The heat engine according to claim 33, further including a control system, said control system including sensors for detecting temperatures of heat sources, the control system altering the adjustment system according to the temperatures of the heat sources so as to control a flow rate of air flowable through the at least one air inlet to the air outlet.

35. A heat engine for generating power from heat from an expanded steam working fluid from a power plant operating a steam cycle, said heat engine comprising:
- a turbine section, said turbine section having at least one air inlet and at least one rotor, wherein said at least one rotor is positioned to be rotated by air flowing through said at least one air inlet;
- a generator coupled to said at least one rotor for generating power as the at least one rotor is rotated;
- at least one tower section, said at least one tower section having an air outlet, wherein said at least one tower section is positioned above the turbine section and arranged to receive air flowing from said turbine section and to deliver the air flowing from said turbine section to said air outlet;
- a heat exchanger section positioned between said turbine section and said at least one tower section and comprising a heat exchanger,
- a compressor with a compressor inlet and a compressor outlet, wherein the compressor inlet of the compressor is adapted to receive the expanded steam working fluid from the power plant, wherein the compressor is adapted to compress the expanded steam working fluid from the power plant to form water,
- wherein the compressor outlet of the compressor is connected to the heat exchanger;
- wherein said heat exchanger is configured to transfer heat from the water to air flowing from said turbine section to said at least one tower section;
- an adjustment system for adjusting an impedance of the turbine section to air entering through the turbine section and flowing up through the heat exchanger section and into the at least one tower section; and
- a control system, said control system including sensors for detecting temperatures of heat sources, the control system altering the adjustment system according to the temperatures of the heat sources so as to control a flow rate of air flowable through the at least one air inlet to the air outlet.

* * * * *